United States Patent [19]

Vakhshoori et al.

[11] Patent Number: 5,216,727
[45] Date of Patent: Jun. 1, 1993

[54] INTEGRATED NONLINEAR WAVEGUIDE SPECTROMETER

[75] Inventors: Daryoosh Vakhshoori, Scotch Plains; George J. Zydzik, Columbia, both of N.J.

[73] Assignee: AT&T Bell Laboratories, Murray Hill, N.J.

[21] Appl. No.: 881,021

[22] Filed: May 8, 1992

[51] Int. Cl.$^5$ .............................................. G02B 6/12
[52] U.S. Cl. ...................... 385/14; 385/31; 385/50; 385/122; 385/131; 385/141; 385/142; 359/332
[58] Field of Search .................. 385/14, 31, 50, 122, 385/131, 141, 142; 359/332

[56] References Cited

U.S. PATENT DOCUMENTS

| | | | |
|---|---|---|---|
| 3,948,583 | 4/1976 | Tien | 385/50 |
| 3,978,426 | 8/1976 | Logan et al. | 385/50 |
| 4,938,553 | 7/1990 | Maerz et al. | 385/14 |
| 4,999,686 | 3/1991 | Autier et al. | 357/16 |

OTHER PUBLICATIONS

D. Vakhshoori "Analysis of Visible Surface-Emitting Second-Harmonic Generators", *J. Appl. Phys.*, vol. 70 No. 10 pp. 5205–5210, Nov. 15, 1991.
D. Vakhshoori. et al., "Blue-Green Surface-Emitting Second-Harmonic Generators . . . ", *Appl. Phys. Lett.* vol. 59, No. 8 Aug. 19, 1991 pp. 896–898.
D. Vakhshoori et al. *J. Lightwave Technology*, vol. 9 No. 7 Jul. 1991, "Integrable Semiconductor Optical Correlator, Parametric Spectrometer for Communication Systems".
R. Normandin et al. "Monolithic, Surface-Emitting, Semiconductor Visible Lasers and Spectrometers . . . " *IEEE Jrn. Quantum Electronics* vol. 27 No. 6, Jun. 6, 1991.
D. Vakhshoori, et al. "Blue/Green Surface-Emitting Second-Harmonic Generators on (111)GaAs Substrate", *CLEO 91*, May 14, 1991, pp. 134–135.
R. Normandin et al., "Wide Bandwidth Nonlinear Surface-Emitting Multilayers for Visible . . . ", *CLOE '91*, May 14, 1991, pp. 136–138.
L. A. Coldren et al. "Directional Reactive-Ion-Etching of InP With Cl$_2$ Containing Gases", *J. Vac. Sci. Technol.*, 19 (2) Jul./Aug. 1981, pp. 225–230.

*Primary Examiner*—Frank Gonzalez
*Attorney, Agent, or Firm*—Oleg E. Alber

[57] ABSTRACT

This invention pertains to integration of nonlinear parametric waveguide spectrometer with polyimide waveguide focusing mirror. The waveguide spectrometer uses nonlinear counter-propagating $\chi^2$ interaction to simulate the action of a grating and produce the required chromatic dispersion. To map the near-field to far-field and separate different wavelength components, an organic-dielectric (e.g. a polyimide/SiO$_2$) guide and a 45° RIE etched mirror were fabricated to simulate a concave focusing integrated mirror. The measured spot size at the focal plane of the mirror was about 0.7 $\mu$m corresponding to about 1.6 Angstroms spectral resolution in agreement with the theoretical prediction. The device has good spectral resolution; however, the conversion efficiency is smaller than the theoretical prediction. Even with the low signal power level, the integrated deviced may be of use in applications that can take advantage of the visible output and do not require high power conversion efficiency.

8 Claims, 3 Drawing Sheets

FIG.3
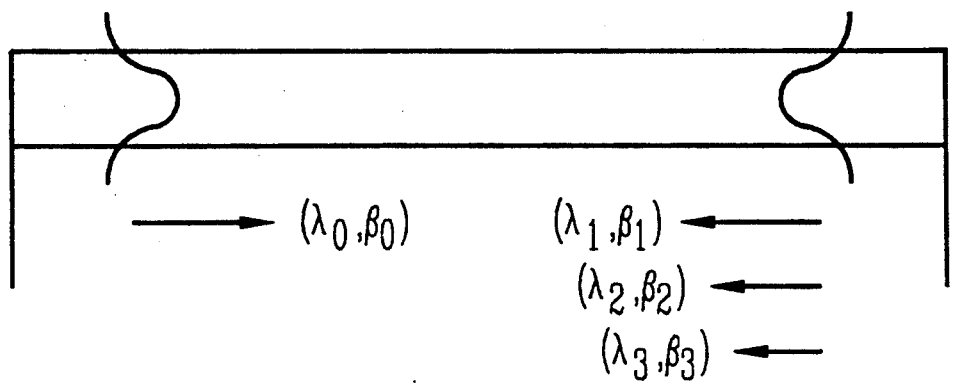
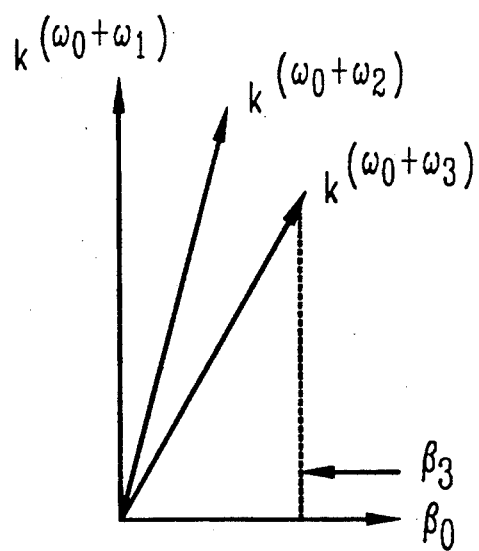
FIG.4

| $\lambda_0$ ⟶ | ⟵ $\lambda_1$ |
| | ⟵ $\lambda_2$ |

$\lambda_0 = 1.064 \mu m$  TM    TE  $\lambda_1 = 0.9734 \mu m$
                                TE  $\lambda_2 = 0.9724 \mu m$

INTEGRATED NONLINEAR WAVEGUIDE SPECTROMETER

TECHNICAL FIELD

This invention pertains to an integrated nonlinear waveguide spectrometer.

BACKGROUND OF THE INVENTION

Optical spectrometers are waveguide devices that use counter-propagating $\chi^2$ nonlinear guide interaction to produce a required chromatic dispersion. In these devices, a reference guided mode interacts with a counter-propagating input infrared signal to generate a surface-emitting sum-frequency signal. The angle by which the up-converted visible signal is radiated is a function of the difference in the wavelength of the reference guided mode and the input signal. By fixing the reference wavelength, the frequency spectrum of the input signal is mapped to an angular spectrum of the up-converted signal in the far-field. The physical principle of the nonlinear parametric waveguide spectrometer is shown in FIGS. 3 and 4. The nonlinear guide acts as a grating in a conventional spectrometer. Two counter-propagating waves, one being a reference mode and the other an input signal, interact and generate surface-emitting sum-frequency signal radiating out of the top surface of the guide with an angle that is defined by the principle of momentum conservation. If one of the counter-propagating beams (reference beam) has a fixed wavelength, the frequency spectrum of the other counter-propagating beam (input signal) is mapped to the angular spectrum of the sum-frequency signal in the far-field. For example, see R. Normandin et al. "Monolithic, Surface-Emitting Semiconductor Visible Lasers and Spectrometers for WDM Fiber Communication Systems", *IEEE Journal of Quantum Electronics*, Vol. 27, No. 6, June 1991, pages 1520–1530, and D. Vakhshoori and W. Wang, "Integrable Semiconductor Optical Correlator Parametric Spectrometer for Communication Systems", *Journal of Lightwave Technology*, Vol. 9, No. 7, July 1991, pages 906–917.

A structure of a nonlinear guide which would be useful for generating green or blue light from radiation injected into the nonlinear guide was suggested by D. Vakhshoori et al. *Conference on Lasers and Electro-Optics Technical Digest*, Series 1991, (Optical Society of America, Washington, D. C.) Vol. 10, page 134, R. Normandin and R. L. Williams, *Conference on Lasers and Electro-Optics Technical Digest* Series 1991 (Optical Society of America, Washington, D. C.) Vol. 10, page 136, D. Vakhshoori et al., "Blue-Green Surface-Emitting Second Harmonic Generation of (111)B GaAs", *Applied Physics Letters*, Vol. 59, No. 8, 19 August 1991, pages 896–898, and D. Vakhshoori, "Analysis of Visible Surface-Emitting Second-Harmonic Generators", *Journal of Applied Physics*, Vol. 70, No. 10, 15 November 1991, pages 5205–5210. Such a structure would include a multilayer structure consisting of paired alternating compound semiconductor layers, each layer in a pair having different composition than the other layer in the pair. However, it is still desirable to provide the nonlinear parametric spectrometer with an imaging system which could map the near-field to far-field on compound semiconductor substrates.

SUMMARY OF THE INVENTION

This invention embodies integration of nonlinear parametric waveguide spectrometer with polyimide waveguide focusing mirror. The waveguide spectrometer uses nonlinear counter-propagating $\chi^2$ interaction to simulate the action of a grating and produce the required chromatic dispersion. To map the near-field to far-field and separate different wavelength components, an organic-dielectric (e.g. a polyamide/$SiO_2$) guide and a 45° RIE etched mirror were fabricated to simulate a concave focusing integrated mirror. The measured spot size at the focal plane of the mirror was about 0.7 $\mu$m corresponding to about 1.6 Angstroms spectral resolution in agreement with the theoretical prediction. The device has good spectral resolution; however, actual conversion efficiency is smaller than the theoretical prediction. The converted signal should be, theoretically, in the order of 0.1 mW, when 100 Mw of reference and input signal are used. Even with the low signal power level, the integrated device may be of use in applications that can take advantage of the visible output and do not require high power conversion efficiency, (i.e. integration with silicon PIN detectors and circuits where 1.5 $\mu$m and 1.3 $\mu$m infrared signals cannot be detected.)

BRIEF DESCRIPTION OF THE DRAWING

FIG. 3 and 4 indicate how frequency spectrum of an input signal is mapped to angular spectrum of an up-converted signal in the far-field;

DETAILED DESCRIPTION

This invention is an integrated optical device in which a nonlinear parametric waveguide spectrometer was integrated with an organic-dielectric waveguide. Forty-five degree angle mirrors etched by Reactive Ion Etching (RIE) were fabricated at both ends of the waveguide to allow the surface light generated by the nonlinear ridge guide to be reflected parallel to the surface and coupled into the organic-dielectric waveguide. In a preferred embodiment, an integrated nonlinear waveguide spectrometer with resolution of 1.6 Å was formed on a 4 mm by 7 mm GaAs substrate by integrating nonlinear periodic GaAs/AlGaAs ridge guide structure having a 2 mm long circular section with a 4 mm long polyimide/$SiO_2$ waveguide.

Figure 1:
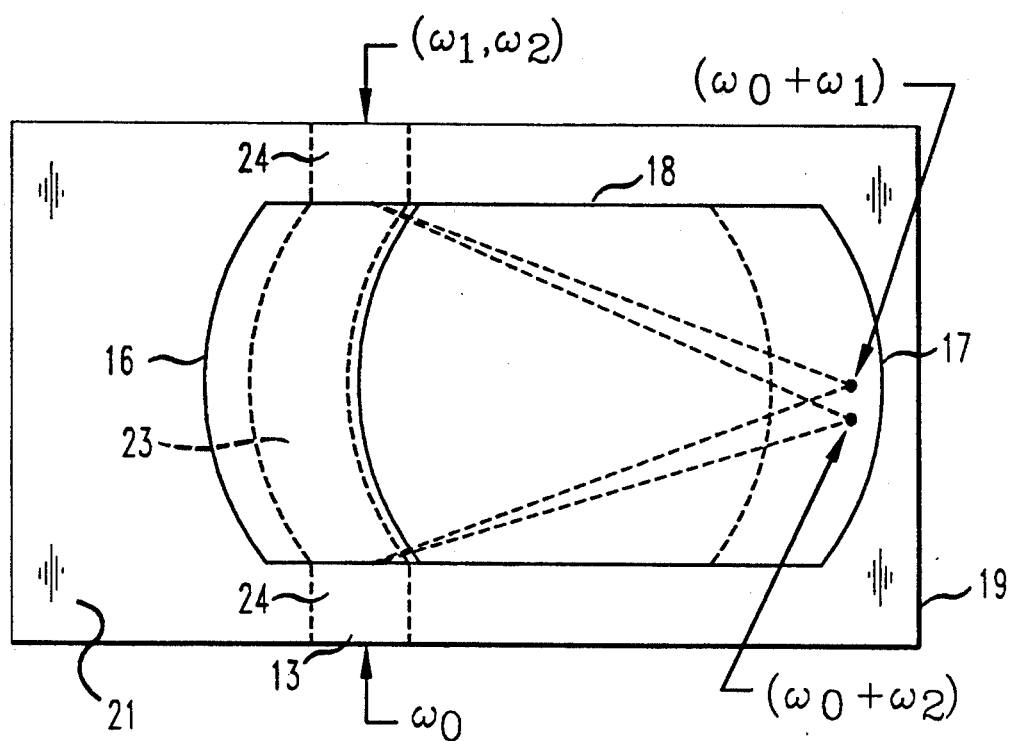
FIG. 1 discloses a top view of a schematic representation of an integrated spectrometer with curved GaAs/AlGaAs ridge guide and polyimide/$SiO_2$ slab guide having at opposite ends of the slab guide curved mirrors positioned at 45° to the plane of the ridge guide.
Figure 2:
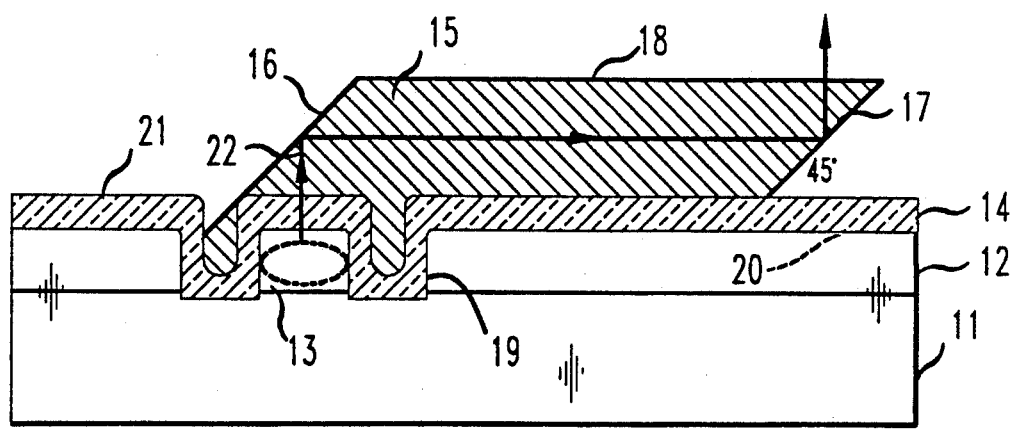
FIG. 2 discloses a cross-sectional side view of a schematic representation of the integrated spectrometer, in which the 45° angle mirrors couple the surface light into and out of the polyimide/$SiO_2$ slab guide.

The integrated optical device is shown schematically in FIGS. 1 and 2 of the drawings, with FIG. 1 being the top view of the integrated optical device, and FIG. 2 being the cross-sectional side view of the integrated optical device. For illustration purposes, dimensions of the integrated device are not drawn to scale.

The integrated optical device, denoted generally by numeral 10, includes a crystalline compound semiconductor substrate, 11, multiquantum well region, 12, including a ridge guide, 13, a dielectric layer, 14, and an organic polymer material layer, 15, provided at opposite ends with 45° mirrors, 16 and 17. Dielectric layer 14 and organic layer 15 form an organic-dielectric waveguide, denominated generally as 18. The dielectric material has a lower index of refraction than the organic material and forms a cladding layer for the organic-dielectric waveguide.

The integrated optical device is fabricated upon substrate 11 having region 12 formed by a plurality of thin layers of alternating composition. The fabrication includes etching in region 12 a pair of trenches, 19, so as to define an isolated ridge guide 13, depositing dielectric layer 14 over an upper surface, 20, of region 12 and in trenches 19, and depositing, over an entire surface, 21, of dielectric layer 14, layer 15 of an optically transmissive organic polymeric material. The slab-like organic-dielectric waveguide 18 is formed by defining outlines of the waveguide on the organic layer and etching the organic layer to a desired form.

Ridge guide 13 was defined by dry-etched trenches 19 to preserve the wafer planarity. Except for the trenches, the wafer is kept planar to facilitate subsequent fabrication of the organic-dielectric waveguide 18 and the 45° mirrors 16 and 17. Ridge guide 13, shown in dashed lines in FIG. 1, consists of a circular arc, 23, in the middle section, and straight sections, 24, at the opposite ends. Small circular arcs may smoothly interconnect circular arc 23 with straight sections 24. In the exemplary embodiment, substrate 11 is of GaAs and region 12 and ridge guide 13 are of GaAs/AlGaAs multilayer, multiperiod structure. Each period is formed by a thin layer of GaAs and a thin layer of $Al_xGa_{1-x}As$, wherein x ranges from 0.7 to 1. The thickness of each layer is equal to one-half the wavelength $$\left(\frac{\lambda}{2}\right)$$

of the visible light generated in the ridge guide. In the preferred embodiment, the dielectric material is $SiO_2$(n=1.47), and the organic material is polyimide (n=1.6) forming a polyimide/$SiO_2$ waveguide. Substrate 11 is about 150 $\mu$m thick, region 12 is about 1.5 $\mu$m thick, trenches 19 are 1-2 $\mu$m wide and about 2 $\mu$m deep, ridge guide is 2-3 $\mu$m wide and about 2 $\mu$m high, the dielectric layer is about 0.5 $\mu$m thick, and organic layer 15 is 2-3 $\mu$m thick. The whole device is about 4 by 7 mm in size, with waveguide 18 being 4 mm long and approximately 2 mm wide. Mirrors 16 and 17 are defined by circular arcs similar to the circular arc of the ridge guide. The circular arcs have a 4 mm radius or curvature. The 45° mirrors are etched by Reactive Ion Etching (RIE) in a manner similar to the technique described by L. A. Coldrean and J. A. Rentschler in "Directional Reactive-Ion-Etching of InP with $CL_2$ Containing Gases", *Journal of Vaccum Science Technology*, Vol. 19, No. 2, July/August 1981, pages 225-230, which is included herein by reference.

In operation, optical radiation a different wavelengths is supplied into opposite ends of ridge guide 12 so that it counter-propagates into mutually opposite directions. One radiation, denoted a reference radiation $\omega_O$, which enters the ridge in one direction, is maintained the same, while the radiation provided from the opposite direction may be injected at a whole range of different wavelengths. Due to the nonlinearity of the ridge guide, a sum-frequency signal is directed into an upward direction toward 45° mirror 16 where it is bounced off 90° into organic layer 15 of the organic-dielectric waveguide 18 and propagates parallel to surface 20 or 21 in the direction of mirror 17 where, at the opposite end of the waveguide 14, the radiation is again deflected. As the up-converted signal 22 from the ridge guide couples into the organic-dielectric waveguide by the reflection off 45° mirror 16, it will form a circular phase front and will focus to a point in a focal plane 4 mm away in the waveguide. At that focal plane, another 45° mirror 17 is used to couple the light out of the surface of the waveguide for detection. Direction of propagation of the radiation out from the optical waveguide is determined by the direction and angle of inclination of mirror 17. Since, in this case, the mirror is at 45° to the plane surface of the waveguide, the radiation will be deflected into an upward direction, where it may be detected. A negative 45° mirror may be used to couple the signal back toward surface 19 for detection with integrated detector array at the focal plane, at or on the substrate.

The resolution of a conventional spectrometer is defined as the change in the input wavelength that shifts the spatial position of the signal from its peak to its first minimum. In this case, for a focusing mirror, e.g. 16, apertured by a 2 mm long nonlinear ridge guide, e.g. 13, the angle subtended at the center of the mirror by the spatial separation of the peak and the first minimum of the signal at the focal plane is:

$$\delta\theta_f = \frac{\lambda_s}{nd} = \frac{0.5\ \mu m}{(1.6)\cdot(2000\ \mu m)} = 1.6 \times 10^{-4}\ \text{rad} \qquad (1)$$

where $\lambda_s$, n, and d are the sum-frequency wavelength, effective index of the polyimide/$SiO_2$ waveguide and the aperture of the curved mirror, respectively. On the other hand, the change in the radiation angle due to a change in the input wavelength (FIG. 3) is:

$$\theta_r = \frac{\beta_o - \beta}{K^{\omega o + \omega}} \qquad (2)$$

$$=> \frac{\delta\theta_r}{\delta\lambda} = \frac{-\lambda_o}{n_s(\lambda_o + \lambda)^2}\left[(n + n_o) - (\lambda + \lambda_o)\frac{\delta n}{\delta\lambda}\right]$$

$$=> \delta\theta_r \approx \frac{\delta\lambda}{\lambda}$$

where $\lambda$, $\lambda_o$, n, $n_o$, $n_s$ are the input fundamental and reference wavelength, the effective index of the GaAs/AlGaAs ridge guide for the input and reference beams and the effective index of the polyimide/$SiO_2$ waveguide for the sum-frequency signal respectively. The third line of Equation 2 is obtained by approximating the values of the above parameters for the case of $\lambda \approx \lambda_o \approx 1.0\ \mu m$. The resolution of the spectrometer is then estimated to be:

$$\delta\theta_r = \delta\theta_r \qquad (3)$$

-continued $$\Rightarrow \delta\lambda \approx 1.6 \text{Å}.$$

Figures 5, 6:
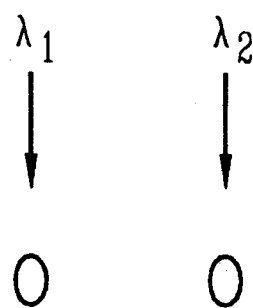
FIG. 5 discloses a schematic representation of a ridge guide with counter-propagating reference mode of a fixed wavelength and input signal of different wavelengths.
FIG. 6 discloses a schematic representation of two spots corresponding to blue signal at the focal plane; which result from an interaction of a reference wavelength with two different Ti-Sapphire laser wavelengths.

The measured output from mirror 17 was recorded on a black and white negative. In FIG. 6 are shown schematically two dots which represent the visible blue signal radiating out of the 45° mirror 17 and located at the focal plane of the circular mirror. Laser light from Nd:YAG was used as the reference beam $\omega_o$ with wavelength $\lambda_o = 1.064$ μm. A tunable Ti-Sapphire laser light was used as the input signal $\omega_1$ and $\omega_2$ with wavelengths $\lambda_1 = 0.9734$ μm and $\lambda_2 = 0.9724$ μm, respectively. The recording was made by first tuning the tunable laser to $\lambda_1 = 0.9734$ μm, sending the reference beam and the first input signal beam into opposite ends of the ridge guide, exposing the film to the up-converted signal, and then without moving the film, tuning the tunable laser to $\lambda_2 = 0.9724$ μm and reexposing the same film to the new up-converted spot at its new position. The up-converted signals from $\lambda_1$ and $\lambda_2$ are spectrally 1 nm apart and the spots are spatially 4 μm separated at the focal plane. The signal spot size (FWHM) was measured to be $\approx 0.7$ μm for each of the two wavelengths which corresponds to a spectral resolution of 1.6 Å in close agreement with the theory. Some small residual spots (not shown) were present around the two main peaks. These are probably the results of multiple reflections and possible deviation of the curved GaAs/AlGaAs nonlinear waveguide from its ideal circular arc. The coupling loss from the nonlinear ridge guide to the organic-dielectric waveguide and the propagation loss of this waveguide at the wavelength of the blue up-converted signal seems to be large; thus, the power of the signal was much less than the value predicted by the theory. The signal should be, theoretically, in the order of 0.1 mW when 100 mW of reference and input signal are used. Nevertheless, since the signal from the integrated structure is visible, the device may be of use in applications requiring integration with silicon detectors and circuits, i.e. integration with silicon PIN detectors and circuits where 1.5 μm and 1.3 mum infrared signals cannot be detected.

The integrated spectrometer with nonlinear GaAs/AlGaAs ridge guide was grown on (100) GaAs substrates. This means that for the surface-bound sum-frequency generation, both TE and TM modes should be excited. This actually is an advantage for the nonlinear parametric waveguide spectrometer since by coupling the reference beam as the TM mode and the input signal as the counter-propagating TE mode, no second harmonic generation to the first approximation should exist. The symmetry of (100) surface thus reduces the background visible radiation and prevents the nonlinear mixing of the different frequency components of the input signal.

Additional advantages and modifications will readily occur to those skilled in the art. Therefore, the invention in its broader aspects is not limited to the specific details, representative devices, and illustrated examples shown and described. Accordingly, various modifications may be made without departing from the spirit or scope of the general inventive concept as defined by the appended claims and their equivalents.

We claim:

1. An integrated optical device, comprising upon a substrate, a nonlinear parametric waveguide spectrometer and an elongated organic-dielectric waveguide positioned above and transverse to the nonlinear waveguide, said nonlinear waveguide being in a form of a ridge guide central portion of which forms a circular arc with a preselected radius of curvature, said ridge guide has a multiperiod structure comprising a plurality of pairs of compound semiconductor layers, composition of one layer in each pair being different from the composition of another layer in the pair, said organic-dielectric waveguide is in the form of an elongated slab of organic material overlaying a thin dielectric layer, the dielectric layer which has lower index of refraction than the organic material, acts as a bottom cladding layer for the organic material, said slab of organic material having 45 degree mirrors at opposite end portions, each mirror being defined by a circular arc with the same radius of curvature as the ridge guide, one mirror is superimposed over said circular arc and intersects a path of visible radiation emanating from said ridge guide so that said radiation is diverted into the slab of organic material and, after encountering the mirror at the opposite end of the slab, is deflected out of the focal plane of that mirror.

2. The device of claim 1 in which said ridge guide is defined by a pair of trenches formed in the surface of a multiperiod structure on a GaAs substrate, said multiperiod structure consisting of a plurality of periods comprising alternating layers of GaAs/AlGaAs.

3. The device of claim 2 in which each of said pairs consists of a layer of GaAs and a layer of $Al_xGa_{1-x}As$ with x ranging from 0.7 to 1.

4. The device of claim 2 in which the thickness of each layer is equal to one-half the wavelength of the visible radiation generated in the ridge guide.

5. The device of claim 1 in which said slab of organic material comprises polyimide.

6. The device of claim 1 in which said dielectric material comprises $SiO_2$.

7. The device of claim 1 in which said mirrors are inclined 45° in the same direction relative to the plane of the ridge guide, so that radiation reaching said other mirror is directed away from the substrate, in an upward direction.

8. The device of claim 1, in which the mirror at the opposite end of the slab is inclined 45° in the direction opposite to that of the 45° mirror overlaying the ridge guide, so that radiation reaching said other mirror is directed toward the substrate.

* * * * *